United States Patent Office 3,546,176
Patented Dec. 8, 1970

3,546,176
PRODUCTION OF UNSATURATED POLYESTERS
John Herbert Umfreville, Wellingborough, England, assignor to Scott Bader & Co., Ltd., Wellingborough, England, a company of Great Britain and Northern Ireland
No Drawing. Filed Dec. 8, 1966, Ser. No. 600,022
Claims priority, application Great Britain, Dec. 13, 1965, 52,836/65, Patent 1,101,247
Int. Cl. C08f *3/70;* C08g *17/10*
U.S. Cl. 260—75
6 Claims

ABSTRACT OF THE DISCLOSURE

An unsaturated polyester compound is prepared by the reaction of an alkylene oxide component with an anhydride component which comprises at least one anhydride of an unsaturated dicarboxylic acid. The process requires a reaction initiator and an organometallic catalyst which is at least partially soluble in said anhydride component. The catalyst for the process may be a compound of titanium, zirconium or cerium wherein said metal is linked through an oxygen atom to an alkyl group or an acyl group.

---

The present invention relates to the production of unsaturated polyesters.

Conventionally the production of unsaturated polyesters from $\alpha,\beta$-unsaturated dicarboxylic acids or anhydrides, possibly modified by co-reaction with saturated dicarboxylic acids, is usually effected by esterification with dihydric alcohols. Typically the mixture of anhydrides and acids with the glycols must be heated to temperatures of the order of 200° C. to bring about reaction. The method has the inherent disadvantage that the water formed by the reaction must be removed.

It is well known that alkylene oxides such as propylene oxide may be used with advantage to avoid the necessity of removing water and that this alternative method of production of polyesters may be carried out at temperatures lower than 200° C. However without catalysts this process is unsatisfactory because of side reactions which necessitate the use of excessive quantities of alkylene oxides to obtain polyesters with sufficiently low acid values. Catalysts suggested for this reaction include oxides, hydroxides and salts of alkali metals and alkaline earth metals, organic amines and zinc salts.

It has also been established that the polyesters prepared from alkylene oxides are of lower reactivity than those prepared from glycols as described above unless the products are heated for 1–3 hours at 200° C. but this procedure leads to products of poor colour.

We have found that the production of unsaturated polyesters is improved by the use of catalysts of a certain type.

According to the present invention we provide a process for the production of unsaturated polyesters which comprises reacting a component (1) consisting of a substituted or unsubstituted alkylene oxide or a mixture of such oxides with a component (2) consisting of an anhydride of an unsaturated dicarboxylic acid or a mixture of such anhydrides, or a mixture of saturated and unsaturated dicarboxylic acid anhydrides, in the presence of a reaction initiator and as catalyst a compound of a metal of Sub-group IV–A of the Mendeleev's Periodic Table or a cerium compound, the said catalyst compound being at least partially soluble in liquefied component (2). Especially suitable catalysts are organic compounds of zirconium, titanium or cerium. Examples of suitable catalysts are zirconium laurate, zirconium octoate, e.g. zirconium 2-ethyl-hexoate, tetrabutyl zirconate, tetrabutyl titanate and zirconium naphthenate. Particularly appropriate catalysts are organic derivatives of metals of Sub-group IV–A of Mendeleev's Periodic Table, Wherein the metal is linked through an oxygen atom to an alkyl group or an acyl group. An example of a suitable cerium compound as catalyst is cerium naphthenate.

With the catalysts used in this invention we have found that unsaturated polyesters may be more quickly prepared from, for instance, maleic anhydride, or a mixture of maleic anhydride with other saturated or unsaturated dicarboxylic acid anhydrides, together with propylene oxide. The reaction is exothermic and a product from a low acid-value is obtained from an amount of propylene oxide which is only slightly greater than stoichiometric.

The products of the above reaction may be heated for several hours at e.g. 200° C. with little deterioration of its colour. The retention of good colour is enhanced by the addition of a small amount of orthophosphoric acid to the mixture prior to heating.

The process of this invention may be carried out at a temperature of 30° to 200° C., preferably at 70° to 170° C., with subsequent cooling applied to maintain the temperature in this range if necessary. It is also necessary that a reaction initiator such as water, a mono- or di-hydric alcohol e.g., propylene glycol, a phenol, or a mono- or di-carboxylic acid, e.g., adipic acid be present and preferably in amounts up to 30 mol precent of the reactants. The reaction initiator is used as the starting point upon which the polyester chains grow and variation in the proportion of initiator will change the molecular weight of the final product.

Component (1) may be an alkylene oxide, e.g., ethylene oxide, propylene oxide or butylene oxide or a substituted alkylene oxide, e.g., styrene oxide, or a glycidyl ether or epichlorohydrin.

Component (2) may be, for example, maleic anhydride or itaconic anhydride, a mixture thereof, or a mixture of one or both thereof with one or more saturated dicarboxylic acid anhydride such as phthalic, succinic, glutaric, diglycollic, tetrahydrophthalic, hexahydrophthalic, endomethylenetetrahydrophthalic, hexachloroendomethylenetetrahydrophthalic, tetrachlorophthalic, and tetrabromophthalic anhydrides. It has been found that mol ratios of maleic anhydride: phthalic anhydride between 1:2 and 3:1 are expedient in the case when a mixture of the two is used.

The esterification reactions of this invention are rapid and exothermic but it is probable that the reaction rates may be increased by conducting them under pressure.

The reaction of this invention can be carried out in a continuous manner. For instance, molten maleic anhydride or a mixture of maleic anhydride with another anhydride may be mixed with a reaction initiator and the said catalyst and led in a flow system to a reactor where they may be mixed with a concurrent flow of propylene oxide; the resulting mixture is conveniently heated for a period of time to complete the reaction.

Unsaturated polyesters prepared according to the present invention may, if desired, be copolymerized with such unsaturated compounds as styrene, diallyl phthalate, triallyl cyanurate, methyl methacrylate or substituted derivatives of them or mixtures of these compounds.

The present invention is illustrated, but not limited to, the following examples, wherein the parts denoted therein are parts by weight. Viscosities of the styrene solutions were measured at 25° C. Example V does not illustrate this invention but serves for comparison purposes.

Except where stated all styrene solutions of the resins in the examples were inhibited with 0.01% hydroquinone and 0.045% of tertiary butyl catechol.

EXAMPLE I

Phthalic anhydride (296 parts), maleic anhydride (196 parts), and water (10.8 parts), are heated together under an atmosphere of nitrogen to 120° C. and zirconium laurate (1.25 parts) is added thereto. Propylene oxide (256 parts) is added to the mixture during 90 minutes whilst the temperature is maintained between 120° C. and 150° C. When the addition is complete the acid number of the polyester is 55. At this stage orthophosphoric acid (0.35 part) of an 88% aqueous solution) is added to the polyester and the temperature of the polyester is raised to 200° C. for four hours.

A solution of the polyester in styrene (67 parts resin to 33 parts styrene) has an acid number of 30 and a viscosity of 6.1 poise. The colour of the resin solution is 1 Gardner. When the styrene solution of the polyester is cured with cyclohexanone peroxide (2%) and cobalt octoate (4% of a 3.63% solution of cobalt octoate in styrene) and the specimen is hardened for 24 hours at room temperature and 3 hours at 80° C., the bend strength of the cast resin is 11,000 lbf./in.$^2$ (BS 2782 Part III 1965, 304 C), the heat deflection temperature is 60° C. (BS 2782 Part I 1965, 102 G) and the Barcol Hardness (GYZJ 934/1) is 44.

EXAMPLES II TO IV

These examples are carried out in a manner similar to Example I. The quantities of the various components are the same as in Example I with the exception of the actual catalyst used, the quantities of which are given in the following table.

EXAMPLE V

The procedure used in Example I is followed except that 0.2 part of zirconium dioxide is used as a catalyst. The acid number at the end of the oxide addition is greater than 150 and this shows that zirconium dioxide which is not soluble in the liquefied anhydride component, is an ineffective catalyst for the purposes of the present invention.

EXAMPLE VI

Tetrachlorophthalic anhydride (1730 parts), maleic anhydride (392 parts) butanol (168 parts), and epichlorohydrin (462 parts) are heated to 110° C. Tetrabutyl zirconate (1.4 gms.) is added thereto and the temperature is raised to 180° C. Epichlorohydrin (694 parts) is added over 65 minutes whilst the temperature is maintained between 170° C. and 180° C. (The acid number at this stage is 31.) Orthophosphoric acid (0.875 part of 88% aqueous solution) is added and the temperature is held at 165° C. for a further three hours. A solution of the polyester in styrene (70 parts resin to 30 parts styrene ) had an acid number of 21.5, a viscosity of 17.8 poise, and a colour of 10 Gardner.

EXAMPLE VII

Maleic anhydride (196 parts), phthalic anhydride (197 parts) and adipic acid (98 parts) are heated to 130° C. and zirconium 2-ethylhexoate (2.5 parts of a petroleum ether solution containing 10% zirconium) is added thereto. Propylene oxide (242 parts) is added during 105 minutes whilst the temperature is maintained between 120° C. and 150° C. The acid number at the end of the oxide addition is 69. The temperature is raised to 200° C. for four hours before the polyester is dissolved in styrene. The acid number of the styrene solution (65 parts resin to 35 parts styrene) is 34, the viscosity is 3.5 poise, and the colour is 1 Gardner.

EXAMPLE VIII

Phthalic anhydride (296 parts), propylene glycol (46 parts) and zirconium 2-ethylhexoate (2.5 parts of a petroleum ether solution containing 10% zirconium) are heated to 150° C. Butyl glycidyl ether (182 parts) and propylene oxide (30 parts is added over 65 minutes whilst the temperature is maintained between 130° C. and 150° C. At this stage maleic anhydride (196 parts) is added followed by propylene oxide (115 parts) which is added over 80 minutes again keeping the temperature between 130° C. and 150 C. The acid number at the end of the oxide addition is 41. Orthophosporic acid (0.35 part of an 88% aqueous solution) is added to the resin and the temperature is raised to 200° C. for four hours. A solution of the polyester in styrene (65 parts resin to 35 parts styrene) has an acid number of 36, a viscosity of 3.4 poise, and the colour is 6 Gardner.

EXAMPLE IX

Maleic anhydride (392 parts), phthalic anhydride (792 parts), propylene glycol (60.8 parts) and zirconium 2-ethylhexoate (5.0 parts of a petroleum ether solution containing 10% zirconium) are charged into a stainless steel autoclave. A pressure of 20 p.s.i. is applied from a cylinder of nitrogen. The temperature is raised to 200° C. and propylene oxide (436 parts) is added over 8 minutes. At this stage the pressure was released and the polyester had an acid number of 64.

| Catalyst | | Quantity, parts | Oxide addition time, mins. | Acid number | Solution viscosity, poise | Colour, Gardner |
|---|---|---|---|---|---|---|
| Example: | | | | | | |
| II | Titanium acetyl acetonate | 1.25 | 115 | 78 | 10.3 | 6 |
| III | Cerium naphthenate | 5.0 | 115 | 72 | 4.9 | 3 |
| IV | Tetrabutyl titanate | 2.95 | 110 | 69 | 4.7 | 10 |

I claim:
1. A process for the production of unsaturated polyester resins which comprises reacting at an elevated temperature in the range of 30° to 200° C. an alkylene oxide component (1) selected from the group consisting of ethylene oxide, propylene oxide, butylene oxide, styrene oxide, a glycidyl ether, epichlorohydrin, and mixtures of such oxides, with a component (2) selected from the group consisting of anhydrides of unsaturated dicarboxylic acids, a mixture of such anhydrides, and a mixture of such anhydrides with saturated dicarboxylic acid anhydrides, in the presence of (a) a reaction initiator selected from the group consisting of water, monohydric and dihydric alcohols, and monocarboxylic and dicarboxylic acids, and (b) a catalyst which is a metal compound at least partially soluble in liquefied component (2), said catalyst being selected from the group consisting of organic compounds of the metals selected from the group consisting of Subgroup IV-A of the Mendeleev's Periodic Table and cerium, wherein said metal is linked through an oxygen atom to a member selected from the group consisting of an alkyl group and an acyl group.

2. The process of claim 1 wherein the catalyst is an organic compound selected from the group consisting of zirconium laurate, zirconium octoate, zirconium naphthenate, tetrabutyl zirconate, tetrabutyl titanate, titanium acetyl acetonate, and cerium naphthenate.

3. The process of claim 1 wherein the polyester reaction is carried out wihtin the temperature range of 70° to 170° C.

4. The process of claim 1 wherein the amount of reaction initiator present is up to 30 mol percent of the reactants.

5. The process of claim 1 wherein component (2) is selected from the group consisting of maleic anhydride, itaconic anhydride, mixtures thereof, and mixtures thereof with at least one saturated dicarboxylic acid anhydride selected from the group consisting phthalic, succinic, glutaric, diglycollic, tetrahydrophthalic, hexahydrophthalic, endomethylenetetrahydrophthalic, hexachloroendomethylenetetrahydrophthalic, tetrachlorophthalic, and tetrabromophthalic.

6. The process of claim 1 wherein component (2) is a mixture of maleic anhydride and phthalic anhydride wherein the mol ratio of maleic anhydride to phthalic anhydride is between 1:2 and 3:1.

References Cited

UNITED STATES PATENTS

| 2,966,479 | 12/1960 | Fischer | 260—78.4(Ep) |
| 3,056,817 | 10/1962 | Werber et al. | 260—75X |
| 3,056,818 | 10/1962 | Werber et al. | 260—75X |
| 3,245,959 | 4/1966 | Roeser | 260—75 |
| 3,257,477 | 6/1966 | Hedrick | 260—78.4(Ep)X |
| 3,326,965 | 6/1967 | Schultheis et al. | 260—75X |
| 3,374,208 | 3/1968 | Seiner et al. | 260—75(n)X |
| 3,254,060 | 5/1966 | Connolly et al. | 260—75(Ep) |
| 2,985,616 | 5/1961 | McGary et al. | 260—75(Ep) |

WILLIAM H. SHORT, Primary Examiner

L. P. QUAST, Assistant Examiner

U.S. Cl. X.R.

260—77, 78.4, 861